3,266,263
CONCENTRATION OF AQUEOUS SOLUTIONS BY CRYSTALLIZATION WITH SONIC DEFOAMING
Lyle W. Pollock, Bartlesville, Okla., assignor to Phillips Petroleum Company, a corporation of Delaware
Filed June 11, 1962, Ser. No. 201,654
5 Claims. (Cl. 62—58)

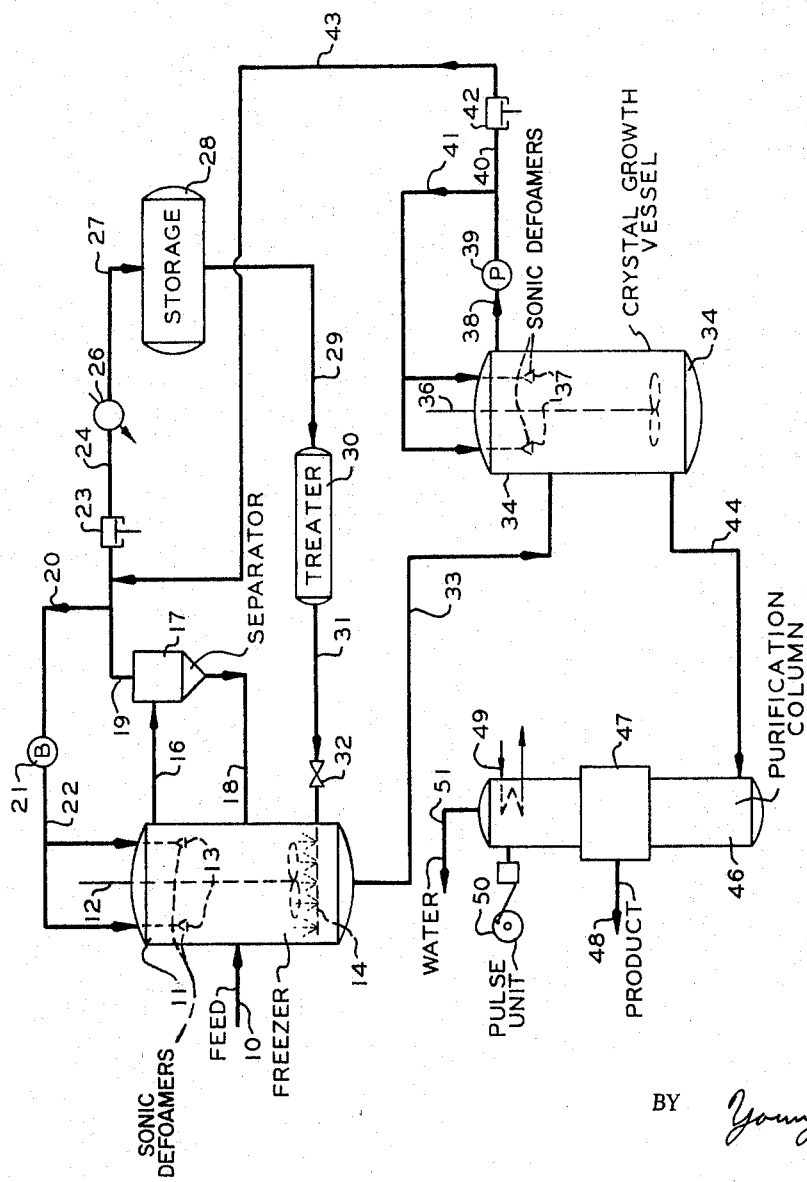

This invention relates to a method of and apparatus for concentrating aqueous solutions by crystallization.

Conventionally, aqueous solutions can be concentrated by crystallization involving chilling the aqueous solution to form ice crystals with subsequent separation of the ice crystals from the mother liquor. This method as applied to the concentration of food products has become commercially acceptable as it can be carried out without damaging the taste of the food product. In this respect, concentration by crystallization represents a considerable improvement over evaporative processes which rely upon heat and/or extremely low pressure. The removal of water by evaporation also results in the removal of much of the essential oils and esters, many of which are not recoverable, so that the concentrated product can never be restored to its original freshness and flavor. Concentration by crystallization can be employed to advantage in the processing of such food products and beverages as milk, fruit juices, vegetable juices, vinegar, beer, wine, liquors and the like.

A method of concentrating by crystallization involves chilling the aqueous solution in a chiller to form a slurry of ice crystals and mother liquor and then forcing the resulting slurry into a crystal purification column such as described in the patent to Schmidt, Re. 23,810, and the patent to R. W. Thomas, 2,854,494, and comprising an elongated confined concentration zone. The crystals are moved in a compact mass into a body of crystal melt which is formed by heating the crystals in a downstream portion of the concentration zone. A portion of the crystal melt is displaced back into the advancing crystal mass. The purification column includes an upstream liquid removal zone, a middle reflux zone and a downstream melting zone. Mother liquor is removed from the crystals in the liquid removal zone and the crystals are melted in the melting zone.

In the chilling step, a scraped-surface stainless steel chiller is conventionally employed. The scraped-surface stainless steel chiller represents a major investment cost and an overall major process expense. It would be desirable, therefore, to eliminate the scraped-surface chiller and thus substantially reduce the process cost of concentrating aqueous solutions by crystallization.

I have by my invention provided an improved method of and apparatus for concentrating an aqueous solution by crystallization whereby said aqueous solution is contacted with carbon dioxide to form a slurry of ice crystals in mother liquor, the slurry is passed to a crystal growth zone, and the ice crystals separated from the mother liquor in a crystal purification zone.

Accordingly, an object of my invention is to provide an improved method of and apparatus for concentrating aqueous solutions.

Another object of my invention is to provide an improved method of and apparatus for concentrating aqueous solutions by crystallization.

Other objects, advantages, and features of my invention will be readily apparent to those skilled in the art from the following description and the appended claims.

The inventive process can be employed to advantage in the processing of such food products and beverages as milk, fruit juices, vegetable juices, vinegar, beer, wine, liquors, and the like. The inventive process is particularly applicable to the concentration of beer as the beer withdrawn from the fermentators usually contains 1 to 2 volumes of carbon dioxide at standard temperature and pressure (60° F. and 1 atmosphere) per volume of liquid beer. Therefore, contacting the beer with carbon dioxide does not involve the introduction of a new component to the beer.

The drawing is a schematic representation of one embodiment of the inventive process.

The invention will hereinafter be described as applied specifically to the concentration of beer, although it is not intended to limit the invention thereto.

Referring to the drawing, beer is passed through conduit means 10 to a freezer 11 (contact zone). Liquid carbon dioxide at a relatively high pressure and from a source hereinafter described is passed via conduit means 31 to freezer 11. The liquid carbon dioxide is vaporized in passing through a conventional pressure reducing valve 32 positioned immediately adjacent to freezer 11 and through means 14 for dispersing the carbon dioxide upwardly throughout the cross section of freezer 11. Upon the vaporization of the carbon dioxide in freezer 11, the temperature of the beer feed is lowered to form a slurry of ice crystals. The temperature within freezer 11 can range from about 0 to 32° F. and the pressure can range from about 150 to 500 p.s.i.g. The weight ratio of liquid carbon dioxide to beer passed to freezer 11 can range from about 1:2 to about 2:1.

Freezer 11 is provided with a means for mixing 12 the carbon dioxide and beer feed streams. In order to prevent foaming, conventional sonic defoamers 13 are employed. Reference is made to Chemical Week, May 6, 1961, page 52, for a discussion of the effectiveness of sonic defoamers as applied to the beer industry.

Vaporous carbon dioxide is withdrawn from freezer 11 via conduit means 16 and passed to a conventional means for separating 17 the vaporous carbon dioxide from entrained liquid such as a cyclone separator. A slurry comprising beer concentrate and ice crystals is withdrawn from freezer 11 via vonduit means 33 and passed to a crystal growth vessel 34. The solids content of the slurry withdrawn from freezer 11 should not exceed 50 weight percent so that the slurry can be handled properly. Preferably, the slurry withdrawn from freezer 11 will contain 30–40 weight percent solids. The process conditions thus maintained within freezer 11 are such as to provide a slurry having the desired solids content.

Dissolved carbon dioxide in the slurry feed to crystal growth vessel 34 is flashed within crystal growth vessel 34, resulting in further freezing and a slight drop in temperature of the beer concentrate-ice slurry. The pressure within crystal growth vessel 34 is less than the pressure within freezer 11 so as to permit flashing of the dissolved carbon dioxide but above atomspheric pressure so as to prevent oxygen from entering the system. Preferably, the pressure within crystal growth vessel 34 will range from about 5 to 25 p.s.i.g, as higher pressures would require a higher pressure in the subsequent purification step. The carbon dioxide flashing step within crystal growth vessel 34 will only slightly reduce the temperature of the slurry feed, the temperature within crystal growth vessel 34 will range from 1 to 2° F. below the temperature within freezer 11.

Crystal growth vessel 34 contains low pressure sonic defoamers 37 to inhibit foaming within vessel 34. The growth of ice crystals within vessel 34 is aided by a conventional agitation means 36 maintaining continuous and intimate contact between the beer concentrate and the ice crystals. It is desired that the slurry passed to crystal growth vessel 34 have as long a residence time within vessel 34 as possible. The residence time within the vessel 34 is limited by the maximum economical capacity of vessel 34. Residence time within crystal growth vessel 34 for the slurry feed is in the range of 0.5 to 10 hours, preferably 0.5 to 4 hours.

Vaporous carbon dioxide is withdrawn from crystal growth vessel 34 via conduit means 38 and a conventional vacuum pump 39. A portion of the vaporous carbon dioxide withdrawn from crystal growth vessel 34 is recycled via conduit means 40 and conduit means 41 to the sonic defoamers 37. In the operation of sonic defoamers 37, the cabon dioxide is jetted through a nozzle of sonic defoamer 37 into a chamber causing the chamber to resonate. The reflector of each of sonic defoamers 37 directs the sound toward the foam causing the formed bubbles to burst when the pressure outside the bubble becomes less than the inside pressure of the bubble during a part of the sonic wave cycle. The remainder of the withdrawn vaporous carbon dioxide is passed via conduit means 40 to a compression means 42, and recycled via conduit means 43 from compression means 42 to the carbon dioxide recovery system hereinafter described.

The slurry is withdrawn from crystal growth vessel 34 via conduit means 44 and passed to a conventional purification column 46. As previously noted, crystal purification column 46 can be a piston-type column substantially as described in the patent to Schmidt, Re. 23,810, or a pulse-type column as described in the patent to R. W. Thomas, 2,854,494. As illustrated, crystal purification column 46 is a pulse-type column having a pulse unit 50. The compacted mass of ice crystals is forced through column 46 by a pumping means not herein illustrated and into a body of melt at the downstream end of purification column 46. The body of melt is formed by melting the crystals through the introduction of heat via heating means 49. The passage of the melt from the purification column 46 is restricted by a means not herein illustrated so that some of the melt is passed into the crystal mass as the crystals are forced through the column into the body of melt. A filter section 47 is provided at an intermediate point in the purification column 46 so that mother liquor (beer concentrate) can be withdrawn from the column and separated from the crystals. The melt comprising water is withdrawn from purification column 46 via conduit means 51.

Although a purification column has herein been illustrated, it is also within the scope of this invention to employ a conventional centrifuge or filter to effect the separation of mother liquor from the crystals formed in freezer 11. The remainder of the inventive process is as heretofore described.

A single stage process for the concentration of aqueous solutions has herein been illustrated. It is within the scope of this invention to further concentrate the mother liquor withdrawn from filter section 47 by employing several stages of concentration. Increased concentration can also be obtained by recycling a portion of the mother liquor withdrawn from filter section 47 via conduit means 48 to the feed to freezer 11, thereby obtaining a mother liquor product of desired concentration.

Vaporous carbon dioxide is withdrawn from separator 17 via conduit means 19 and a portion of the withdrawn vaporous carbon dioxide passed via conduit means 20, blower 21 and conduit means 22 to high pressure sonic defoamers 13 operated as described in connection with sonic defoamers 37 with the exception that a high carbon dioxide pressure is employed to generate the sound. The remainder of the withdrawn vaporous carbon dioxide is passed to a compression means 23 in combination with the recycled carbon dioxide stream from compression means 42. The compressed carbon dioxide is passed via conduit means 24 to a cooler 26 and from cooler 26 via conduit means 27 to a liquid carbon dioxide storage vessel 28. The temperature and pressure of the stored liquid carbon dioxide is maintained in the range of 50 to 80° F. and in the range of 650 to 970 p.s.i.a., respectively.

Liquid carbon dioxide is withdrawn from storage vessel 28 via conduit means 29 and passed to a treater 30. Treater 30 is employed to remove any lubricating oil or other odor or taste bodies present in the liquid carbon dioxide as a result of the carbon dioxide compression and condensing process steps. If a diaphragm compressor is employed, possible contamination of the carbon dioxide would be slight and treater 30 would not be required. Treater 30 can contain an adsorbent material such as activated carbon or silica gel. Treated carbon dioxide is withdrawn from treater 30 via conduit means 31 and passed to freezer 11 in the heretofore described manner.

The following example is presented as illustrative of the inventive process. It is not intended that the invention should be limited thereto.

*Example*

Beer comprising 3.6 weight percent ethyl alcohol, 5.5 weight percent sugars and 90.9 weight percent water is passed via conduit means 10 to freezer 11 at the rate of 1000 pounds per hour. Liquid carbon dioxide at a pressure of 900 p.s.i.g. and a temperature of 75° F. is passed via conduit means 31 to freezer 11 with the feed weight ratio of carbon dioxide to beer of 1:2. The temperature within freezer 11 is 27° F. and the pressure is 470 p.s.i.a. A slurry comprising 35.0 weight percent solids is withdrawn from freezer 11 and passed via conduit means 33 to crystal growth vessel 34. Crystal growth vessel 34 is operated at a pressure of 5 p.s.i.g. and the temperature within crystal growth vessel 34 is 26° F.

The slurry is withdrawn from crystal growth vessel 34 and passed via conduit means 44 to purification column 46. Melt comprising 0.1 weight percent ethyl alcohol, 0.2 percent sugars and 99.7 weight percent water is withdrawn from purification column 46 via conduit means 51 at the rate of 314 pounds per hour. Mother liquor (beer concentrate) comprising 5.2 weight percent ethyl alcohol, 7.8 weight percent sugars and 87.0 weight percent water is withdrawn from filter section 47 via conduit means 48 at the rate of 686 pounds per hour.

The ratio of feed to mother liquor, evidence of the effectiveness of the concentration process, is equal to 1.46. A beer concentrate is obtained containing the flavor bodies present in the feed mixture to freezer 11.

As will be evident to those skilled in the art, various modifications of this invention can be made, or followed, in the light of the foregoing disclosure and discussion without departing from the spirit or scope thereof.

I claim:
1. A process for concentrating an aqueous solution which comprises the steps of contacting said aqueous solution with carbon dioxide so as to form a slurry of ice crystals and aqueous solution in a crystal forming zone; passing vaporous carbon dioxide to a first sonic defoaming means positioned within said crystal forming zone; withdrawing vaporous carbon dioxide from said crystal forming zone; passing said slurry from said crystal forming zone to a crystal growth zone; maintaining the temperature in said crystal growth zone at least 1 to 2° F. below that in said crystal forming zone so as to provide for continuous growth of said ice crystals; passing vaporous carbon dioxide to a second sonic defoaming means positioned within said crystal growth zone; withdrawing carbon dioxide from said crystal growth zone; maintaining the pressure within said crystal growth zone lower than the pressure within said crystal forming zone; permitting said ice crystals to grow within said crystal growth zone; and separating a concentrated aqueous solution from the slurry withdrawn from said crystal growth zone.

2. A process for concentrating an aqueous solution which comprises contacting said aqueous solution with carbon dioxide so as to form a slurry of ice crystals and aqueous solution in a crystal forming zone; passing vaporous carbon dioxide to a first sonic defoaming means positioned within said crystal forming zone; withdrawing vaporous carbon dioxide from said crystal forming zone, passing said slurry from said crystal forming zone to a crystal growth zone; maintaining the temperature in said crystal growth zone at least 1 to 2° F. below that in said crystal forming zone so as to provide for continuous growth of said ice crystals; passing vaporous carbon dioxide to a second sonic defoaming means positioned within said crystal growth zone; withdrawing carbon dioxide from said crystal growth zone; maintaining the pressure within said crystal growth zone lower than the pressure within said crystal forming zone; permitting said ice crystals to grow in said crystal growth zone; passing a slurry comprising ice crystals and aqueous solution from said crystal growth zone to a crystal purification zone wherein a compact mass of said crystals is passed into a body of crystal melt formed by melting said ice crystals in a downstream region of said purification zone while melt is displaced into said crystal mass; withdrawing water from a downstream region of said purification zone and withdrawing a concentrated aqueous solution from an intermediate range region of said purification zone.

3. The process of claim 1 wherein the residence time within said crystal growth zone is in the range 0.5 to 10 hours.

4. The process of claim 2 wherein said aqueous solution comprises beer.

5. The process of claim 4 wherein the temperature and pressure of said contact zone is maintained in the range of 0 to 32° F. and 150 to 500 p.s.i.g., respectively, the weight ratio of liquid carbon dioxide to beer passed to said contact zone is in the range from 1:2 to 2:1, slurry residence time within said crystal growth zone is in the range of 1 to 10 hours, and the pressure within said crystal growth zone is maintained in the range from 5 to 25 p.s.i.g.

References Cited by the Examiner

UNITED STATES PATENTS

| | | |
|---|---|---|
| 2,564,765 | 8/1951 | Mercier. |
| 2,672,487 | 3/1954 | Tegge. |
| 2,683,178 | 7/1954 | Findlay. |
| 2,881,230 | 4/1959 | Buell. |
| 3,017,751 | 1/1962 | Hawkins _____ 62—58 |
| 3,117,005 | 1/1964 | Coutts _____ 252—361 X |
| 3,137,554 | 6/1964 | Gilliland et al. _____ 62—58 X |
| 3,193,395 | 7/1965 | Tabler et al. _____ 62—58 X |

FOREIGN PATENTS

| | | |
|---|---|---|
| 841,359 | 2/1939 | France. |
| 841,374 | 7/1960 | Great Britain. |

NORMAN YUDKOFF, *Primary Examiner.*

G. P. HINES, *Assistant Examiner.*